Patented Apr. 24, 1951

2,550,609

UNITED STATES PATENT OFFICE 2,550,609

ADDITION OF A DESICCANT TO A FLUIDIZED IRON REDUCTION PROCESS

William L. Slater, Jr., Alhambra, Calif., assignor to The Texas Company, New York, N. Y., a corporation of Delaware No Drawing. Application December 24, 1947, Serial No. 793,765

4 Claims. (Cl. 252—472)

The present invention relates to catalysts for the synthesis of hydrocarbons, oxygenated hydrocarbons and the like, from carbon oxide and hydrogen, and is more particularly concerned with the step of catalyst reduction.

In accordance with this invention, an oxidized metal of the iron group, such, for example, as ferric oxide or the like, usually associated with suitable promoters, activators, or other modifying agents, is reduced at elevated temperatures and preferably under superatmospheric pressure by contact with a stream of hydrogen. Reduction is carried out in the presence of a nongaseous desiccant material effective to take up water promptly as it is produced in the course of reduction and thus enable the reduction to proceed in the absence of or in the presence of a substantially lower partial pressure of water vapor than that which prevails in the absence of the desiccant.

Advantageously, use of the desiccant material is postponed until later stages of reduction, when the reaction between the hydrogen and the remaining oxide becomes excessively slow and difficult. At this time, presence of the desiccant material in the reduction zone appears to speed and facilitate materially the sluggish reaction, substantially increasing the rate of catalyst reduction and resulting in a more completely reduced product. Presumably, this effect follows from the fact that water vapor tends to suppress reduction, while lower water vapor concentrations favor rapid completion of the reaction.

Provision may be made for continuously introducing a solid particle desiccant material to the reduction zone as a finely divided phase suspended in the flow of hydrogen. As the hydrogen stream circulates cyclically through the reducing zone, the suspended particles absorb water vapor and pass out with the residual hydrogen withdrawn from the zone. Alternatively, a sufficient batch of relatively coarser particle desiccant may be retained in intimate admixture with the catalyst until completion of the reduction step, whereupon pneumatic separation may be effected by increasing the flow of reduction gas so that the hydrated desiccant is blown out of the zone. Obviously, in view of the foregoing, any other suitable method of separation may be employed.

The catalyst, reduced as above, is in a form effective for contact with synthesis gas comprising hydrogen and carbon monoxide, under reaction conditions, including an elevated temperature and pressure at which the hydrogen catalytically reduces the carbon monoxide with direct production of desired products, including hydrocarbons and oxygenated hydrocarbons. Preferably, however, such use of the catalyst is preceded by a conditioning treatment, such as is disclosed in copending application Serial No. 570,223, filed December 28, 1944, now U. S. 2,445,795, wherein use is initiated at a temperature substantially below normal operating temperature with a slow increase to operating temperature over a substantial time period.

From the foregoing it will be apparent that an essential characteristic of the present desiccant material or dehydrating agent is that it readily combines with water at the elevated temperature and pressure at which reduction is effected, to form a compound or compounds stable under such conditions. In short, the dissociation pressure of the compound formed by combination of the desiccant with water is lower, at the temperature prevailing in the reduction zone, than the partial pressure of water vapor which would prevail in ordinary operation, preferably less than that partial pressure of water vapor in the gases after condensation at pressures in the order of 100 to 400 pounds per square inch, and at normal temperatures of about 100° F. and preferably about 70° F.

Another desirable feature of the dehydrating agent is that, during the course of hydration, it advantageously tends to disintegrate or crumble into smaller, fluffy particles which can be readily removed from the catalyst by ordinary separating steps or can be swept out by a slight increase in the upflow of gases.

Examples of effective desiccant materials are carbides of aluminum and particularly alkaline earth metals, such, for example, as calcium carbide and barium carbide, which combine chemically with water vapor to form corresponding alkaline metal oxides and liberate gaseous acetylene. The carbides of the rare earth metals are also useful in this respect. On the other hand, metal hydrides, such for example, as calcium or barium hydride, are similarly effective to combine with water vapor, simultaneously liberating additional hydrogen to supplement the stream of reducing agent. It is to be noted that substances such as calcium oxide, barium oxide and magnesium oxide, which chemically combine with water to form the hydroxides and substances such as calcium sulfate and the perchlorates of magnesium and barium which form hydrates, are also useful as desiccants in the present process.

Agents which remove water by chemical combination are, in general, more suitable for use in reduction steps carried out at relatively high temperatures, as for example, in the range of about 600 to 800° F., as contrasted with those which form hydrates, which are usually effective at lower temperatures, for example, below about 400° F. That is to say, compounds that are formed by chemical interaction of the water and desiccant are more stable since they require higher temperatures to convert them to their anhydrides.

The reduction of the catalyst contemplated, in accordance with the present invention, may be carried out at the lower temperature ranges, but is preferably effected in the case of a catalyst comprising iron, at temperatures ranging above about 600° F., as for example, 650 to 700° F., frequently under more elevated temperatures up to 1000° F. and above, usually under superatmospheric pressure, ranging, for example, up to 200 to 400 pounds per square inch and normally is accompanied by formation of substantial amounts of water.

As the reduction approaches completion, the reaction slows considerably in the presence of only small proportions of water vapor. Accordingly, even where the hydrogen is continuously passed through the reduction zone, withdrawn, dried and recirculated, at substantial rates, completion of the reduction requires excessive time and results in an uneconomical loss of highly diffusible hydrogen. This follows from the fact that dry hydrogen introduced to the zone is promptly contaminated with product water vapor.

Therefore, the present invention effects a substantial increase in rate of reduction by the removal of water vapor as it is formed so that the partial pressure of water vapor is substantially lowered in the reduction zone. Thus the decrease in the reduction rate normally encountered toward the end of the operation is overcome. This permits reduction at lower temperatures and at lower rates of hydrogen circulation of the reducing gas than hithertofore. Therefore, the preparation of substantial quantities of catalyst may be effected with a more economical utilization of hydrogen and less loss of time, and the final product may be more fully and completely reduced. In particular, the saving in hydrogen lost by diffusion during more extended treatment may involve a substantial economy in operation.

As intimated above, it is contemplated employing the desiccant in solid particle form, preferably in the form of powder or within the same or similar particle size range as the catalyst particles so that intimate contact is effected within the reaction zone.

The catalyst powder is usually in the form of a mass of solid particles disposed loosely within the zone and preferably aerated to a dense fluid phase by means of the upflowing reducing gas. The invention, however, is not thus limited, and broadly contemplates the reduction of any suitable synthesis catalyst, whether in the form of fluid or stationary bed of fixed particles. In the fixed bed type of operation, or even with so-called "moving" beds of catalyst, the particles may be in relatively coarse form, providing substantial internal free space through which a finely powdered desiccant will flow when suspended in the reducing gas.

In either case, introduction of desiccant particles as a suspended phase entrained in the reducing gas results in immediate distribution and intermixture of the desiccant with the mass of catalyst particles. Operating in this manner, separate provision for mixing and distributing the desiccant in the catalyst powder is obviated.

As intimated above, the rate of gaseous flow through the fluid phase catalyst mass, and degree of subdivision of the desiccant powder may be regulated so that the catalyst particles remain within the reduction zone while the desiccant is withdrawn with the effluent hydrogen. This can be effected with the catalyst in either dense fluid phase, or fixed bed condition. Or, somewhat larger particles of desiccant may be retained in the zone, at least until the particles have completed chemical reaction with the water vapor and assume a more buoyant condition at which they are entrained in and removed in the circulating flow of reducing gas.

Alternatively, a stoichiometric quantity of desiccant may be mechanically mixed with the catalyst and the reduction completed under flow rates at which entrainment of solid particles is negligible, and thereafter, the flow rate increased to a value at which the more buoyant desiccant particles are in effect blown out of the catalyst.

Provision may be made for filtering, electrostatically separating or otherwise removing particles from the effluent hydrogen. Similarly, any conventional means of separation may be employed to recover desiccant solid from the treated catalyst. For example, magnetic separation affords an effective means whereby the final reduced catalyst is preferably rendered substantially free from the added solid desiccant.

In accordance with one method of operation, a stream of hydrogen is continuously passed through a mass of iron oxide powder, comprising mainly $Fe_3O_4$ and $Fe_2O_3$ finer than about 50 mesh and containing a more or less uniform distribution of particles down to about 20 microns in diameter. Preferably, the hydrogen is passed upwardly through the mass at a temperature of about 700° F. and at a suitable linear velocity such that the catalyst particles are held in a dense fluid phase without material entrainment in the effluent gas. Unconsumed excess hydrogen is withdrawn from the top of the dense fluid phase, cooled to condense contained moisture and separated from the condensed water. Thereafter, it is usually continuously reheated, and continuously recycled to the inlet with an appropriate supplement of fresh hydrogen to maintain the required flow.

Under these conditions, reduction of the catalyst proceeds at a fairly rapid rate until somewhat above about 80 per cent of the oxide has been reduced to metallic iron.

At this point, a batch of powdered calcium carbide is thoroughly mixed with the catalyst in at least the stoichiometrical proportion effective under the temperature and pressure conditions prevailing to absorb the water vapor formed during subsequent reduction. Recirculation of the hydrogen is continued as before, until at least 95 and preferably 100 per cent of the catalyst has been completely reduced, and the desiccant is then separated from the catalyst by any desired means.

In accordance with one specific embodiment of the present invention, there is provided about 750 pounds of an alkali impregnated ferric oxide finer than 35 mesh, about 80 per cent being finer than 100 mesh, and about 30 per cent being finer than 325 mesh.

The ferric oxide contains approximately 2 per cent alumina and about 1 per cent potassium, introduced by uniformly wetting the powder with potassium carbonate solution and drying. The mass of catalyst is maintained at a controlled temperature of about 700° F. and a stream of hydrogen caused to flow upwardly therethrough at a rate just below about one linear foot per second, neglecting the volume occupied by the catalyst particles, such that the iron oxide expands into a dense fluid phase. Pressure is maintained at about 200 pounds per square inch gauge, effluent hydrogen being continuously withdrawn from the upper pseudo-liquid level of the fluid phase, cooled to 70° F., subjected to separation of condensed water, reheated to about 700° F. and recycled to the reduction zone as before. After a period of about 18 hours, withdrawn samples show about 80 per cent reduction of the iron oxide and a consumption of about 67,000 standard cubic feet of hydrogen.

At this point, approximately 90 pounds of substantially pure, finely powdered calcium carbide is carried into intimate admixture with the partially reduced catalyst in the reduction zone by injection into the incoming stream of hydrogen. Introduction of the hydrogen stream is continued under the same conditions as before. After about 6 hours, the withdrawn samples indicate complete reduction of the particles. The rate of hydrogen recirculation is thereupon increased to about 1.5 feet per second for one hour, so that the effluent gas carries out the buoyant particles of hydrated desiccant. The effluent hydrogen, with the entrained particles, is passed through a cyclone to separate hydrated particles of desiccant. The catalyst thus prepared is ready for contact with synthesis gas under a temperature of, for example, 625° F., and a pressure of about 250 pounds per square inch, for the direct production of normally liquid hydrocarbons.

Where the introduction of a calcium carbide is omitted, the reduction of the last 20 per cent of the iron oxide will occupy about 18 hours and result in a consumption of about 60,000 additional standard cubic feet of hydrogen. Moreover, even after such treatment, it appears that the catalyst reduction is not as complete where reduction is concluded in the presence of the desiccant.

By way of further example, a powdered mill scale may be reduced under conditions substantially the same as in the above stated example, in which case the addition of calcium carbide can be reduced to about 85 pounds.

It is particularly important to note that the acetylene formed during the course of the reaction has little or no impairing effect upon the step of reduction. This is believed to follow from the fact that in the presence of the fine, reduced metal particles, the acetylene is rapidly decomposed to hydrogen and hydrocarbon materials which may appear in the condenser and separator.

Obviously, impairing side products of the desiccant action are desirably avoided. It is, therefore, a further desirable feature of the desiccant that it chemically combine with the water vapor without the production of products which interfere with the desired reduction of catalyst.

While the invention in its preferred aspect is devoted to the preparation of iron containing hydrocarbon catalysts, it also contemplates, as indicated above, the reduction of equivalent hydrocarbon synthesis catalysts from the oxides of the other metals of the iron group such as cobalt, nickel or ruthenium. In each case, preferred temperature of treatment may vary somewhat. In the case of the cobalt oxide, for example, reduction is usually carried out at rather low temperatures, as low as 350–400° F. This, as previously indicated, opens a somewhat wider fields of available desiccants, such as the hydrate-forming materials mentioned above.

While mention has been made of certain particular activating and promoting agents, the invention contemplates substitution of any of the materials proposed by the art for the purpose of thus improving and modifying the action of the catalyst, such for example, as the oxides of the alkali metals or the alkaline earth metals, titania, zirconia, magnesia, thoria and many others. In general, the invention contemplates the inclusion of an activator and promoter in the usual small percentages, from .5 to 5.0 per cent, which in each case is usually sufficient to permit realization of the desired effect.

Obviously, many modifications and variations of the invention as set forth above may be made without departing from the spirit and scope thereof and therefore only such limitations should be imposed as are indicated in the appended claims.

What I claim is:

1. In the preparation of catalysts for the synthesis of hydrocarbons, oxygenated hydrocarbons and the like by the catalytic reduction of carbon monoxide with hydrogen wherein an oxidation product of a metal of the iron group is reduced by a stream of hydrogen, the improvement which comprises passing said stream of hydrogen in contact with a powdered mass of said oxidation product in a reduction zone under reaction conditions including an elevated temperature at which the metal compound is reduced to the metallic state, continuing passage of hydrogen until at least about 80 percent of the powder is reduced to the metallic form, thereafter adding a solid particle desiccant material effective to combine with water vapor under said reaction conditions with the formation of a dry solid product ineffective to impair reduction of the metal and capable of being separated from the catalyst particles, continuing said passage of hydrogen under said reaction conditions until reduction is substantially completed and separating the resulting desiccant material from said reduced catalyst.

2. The method according to claim 1 wherein said desiccant comprises calcium carbide.

3. In the preparation of catalysts for the synthesis of hydrocarbons, oxygenated hydrocarbons and the like by the catalytic reduction of carbon monoxide with hydrogen wherein an oxidation product of a metal of the iron group is reduced by a stream of hydrogen, the improvement which comprises passing said stream of hydrogen in contact with a powdered mass of said oxidation product in a reduction zone under reaction conditions including an elevated temperature at which the metal compound is reduced to the metallic state, continuing passage of hydrogen until at least about 80 percent of the powder is reduced to the metallic form, thereafter suspending in the stream of hydrogen supplied to said reduction zone a finely divided, solid particle desiccant material effective to combine with water vapor under said reaction conditions with the formation of a dry, solid product ineffective to impair reduction and capable of being separated from the catalyst particles, passing said stream of hydrogen containing said suspended desiccant material through said reduction zone until reduction of the catalyst is substantially completed and separating resultant desiccant material from the reduced catalyst.

4. The method according to claim 3 wherein the oxidation product is in a relatively coarse particle form such that it remains essentially in the reaction zone and the solid particle desiccant material is in the form of a relatively fine powder which remains suspended in the stream of hydrogen and is continually withdrawn from the reduction zone in entrainment in the effluent gas.

WILLIAM L. SLATER, Jr.

REFERENCES CITED

The following references are of record in the file of this patent:

UNITED STATES PATENTS

| Number | Name | Date |
|---|---|---|
| 2,048,112 | Gahl | July 21, 1936 |
| 2,120,958 | Coons | June 14, 1938 |
| 2,296,405 | Schenermann et al. | Sept. 22, 1942 |
| 2,452,712 | Atwell | Nov. 2, 1948 |